(12) United States Patent
Luo et al.

(10) Patent No.: US 10,638,105 B2
(45) Date of Patent: Apr. 28, 2020

(54) METHOD AND SYSTEM OF MULTI-DYNAMIC RANGE MULTI-LAYER VIDEO BLENDING WITH ALPHA CHANNEL SIDEBAND FOR VIDEO PLAYBACK

(71) Applicant: Intel Corporation, Santa Clara, CA (US)

(72) Inventors: Ning Luo, Shanghai (CN); Changliang Wang, Bellevue, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/304,456

(22) PCT Filed: Jun. 27, 2016

(86) PCT No.: PCT/CN2016/087263
§ 371 (c)(1),
(2) Date: Nov. 26, 2018

(87) PCT Pub. No.: WO2018/000126
PCT Pub. Date: Jan. 4, 2018

(65) Prior Publication Data
US 2019/0149792 A1    May 16, 2019

(51) Int. Cl.
| | |
|---|---|
| *H04N 9/76* | (2006.01) |
| *G06T 5/00* | (2006.01) |
| *G06T 5/50* | (2006.01) |
| *G09G 5/10* | (2006.01) |
| *G06F 3/14* | (2006.01) |

(52) U.S. Cl.
CPC ............... *H04N 9/76* (2013.01); *G06F 3/14* (2013.01); *G06F 3/1454* (2013.01); *G06T 5/007* (2013.01); *G06T 5/50* (2013.01); *G09G 5/10* (2013.01); *G06T 2207/10016* (2013.01); *G06T 2207/10024* (2013.01); *G06T 2207/20221* (2013.01); *G09G 2340/0428* (2013.01); *G09G 2340/10* (2013.01)

(58) Field of Classification Search
CPC .............................. G06T 15/205; G06T 5/007
See application file for complete search history.

(56) References Cited

U.S. PATENT DOCUMENTS

| | | | |
|---|---|---|---|
| 8,593,480 B1 * | 11/2013 | Ballestad | H04N 1/6027 |
| | | | 345/590 |
| 9,961,237 B2 * | 5/2018 | Atkins | H04N 1/6058 |
| 2004/0114813 A1 * | 6/2004 | Boliek | G06K 9/00463 |
| | | | 382/233 |

(Continued)

FOREIGN PATENT DOCUMENTS

| | | |
|---|---|---|
| CN | 101082992 | 5/2014 |
| CN | 103827956 | 5/2014 |

(Continued)

OTHER PUBLICATIONS

International Preliminary Report on Patentablity for PCT Application No. PCT/CN16/87263, dated Jan. 10, 2019.

(Continued)

*Primary Examiner* — Paulos M Natnael
(74) *Attorney, Agent, or Firm* — Green, Howard & Mughal LLP

(57) ABSTRACT

Methods, systems, and articles of multi-dynamic range multi-layer video blending with alpha channel sideband for video playback.

24 Claims, 8 Drawing Sheets

(56) References Cited

U.S. PATENT DOCUMENTS

| | | | | |
|---|---|---|---|---|
| 2004/0114814 | A1* | 6/2004 | Boliek | G06K 9/00463 382/233 |
| 2011/0235888 | A1* | 9/2011 | Takahashi | A61B 6/5205 382/132 |
| 2012/0206474 | A1* | 8/2012 | Holland | G09G 5/026 345/589 |
| 2015/0156469 | A1* | 6/2015 | Qu | H04N 9/8715 348/43 |
| 2015/0243200 | A1 | 8/2015 | Pan | |
| 2015/0245004 | A1* | 8/2015 | Guo | H04N 5/46 348/453 |
| 2015/0256860 | A1* | 9/2015 | Kunkel | G06T 5/00 348/598 |
| 2019/0051229 | A1* | 2/2019 | Ozguner | G09G 3/2003 |

FOREIGN PATENT DOCUMENTS

| | | |
|---|---|---|
| CN | 103312942 | 7/2016 |
| EP | 3035678 | 6/2016 |

OTHER PUBLICATIONS

Wikipedia, "Alpha compositing", Retrieved online via: https://en.wikipedia.org/w/index.php?title=Alpha_compositing&oldid=723893039.

Wikipedia, "RGBA color space", Retrieved online via https://en.wikipedia.org/w/index.php?title=RGBA_color_space&oldid=717177309.

Wikipedia,"Tone Mapping", Retrieved online via https://en.wikipedia.org/w/index.php?title=tone_mapping&oldid=715878714.

International Search Report and Written Opinion for PCT Patent Application No. PCT/CN16/87263, dated Mar. 22, 2017.

\* cited by examiner

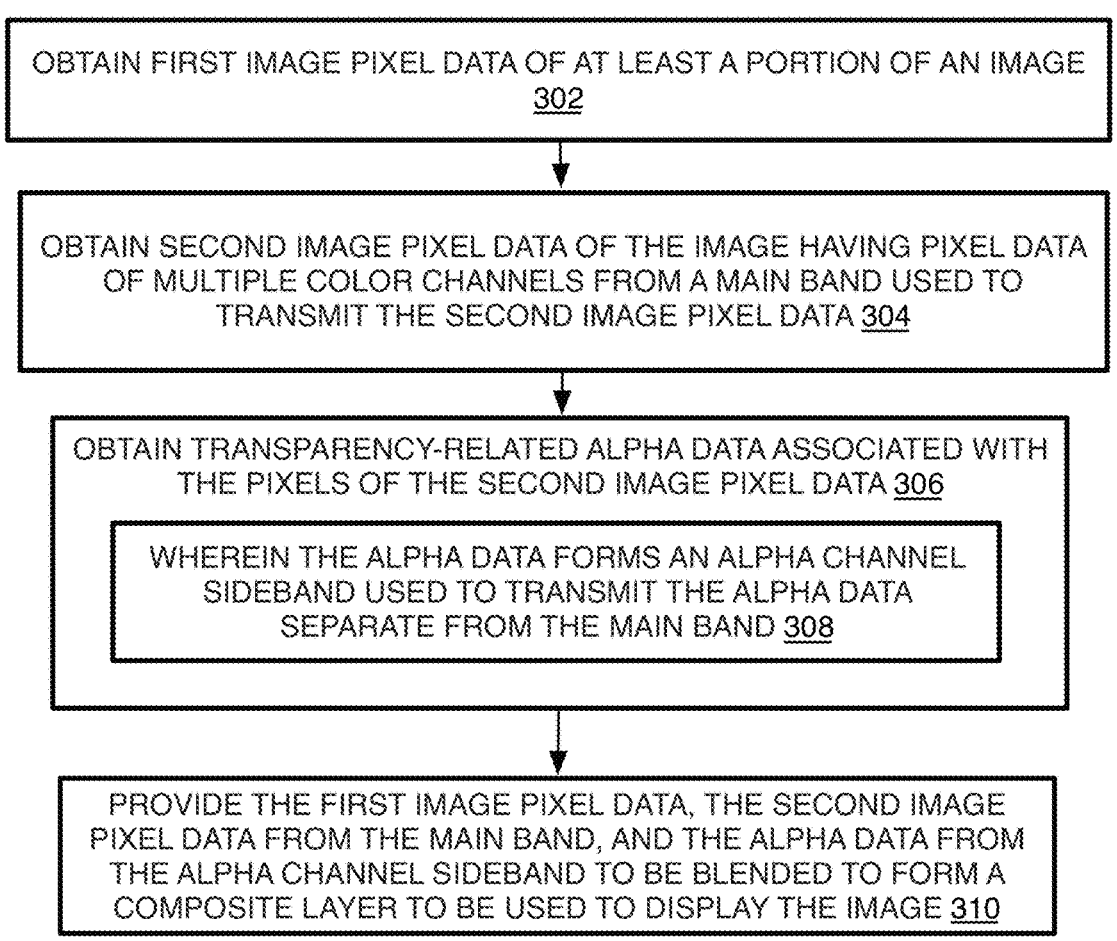
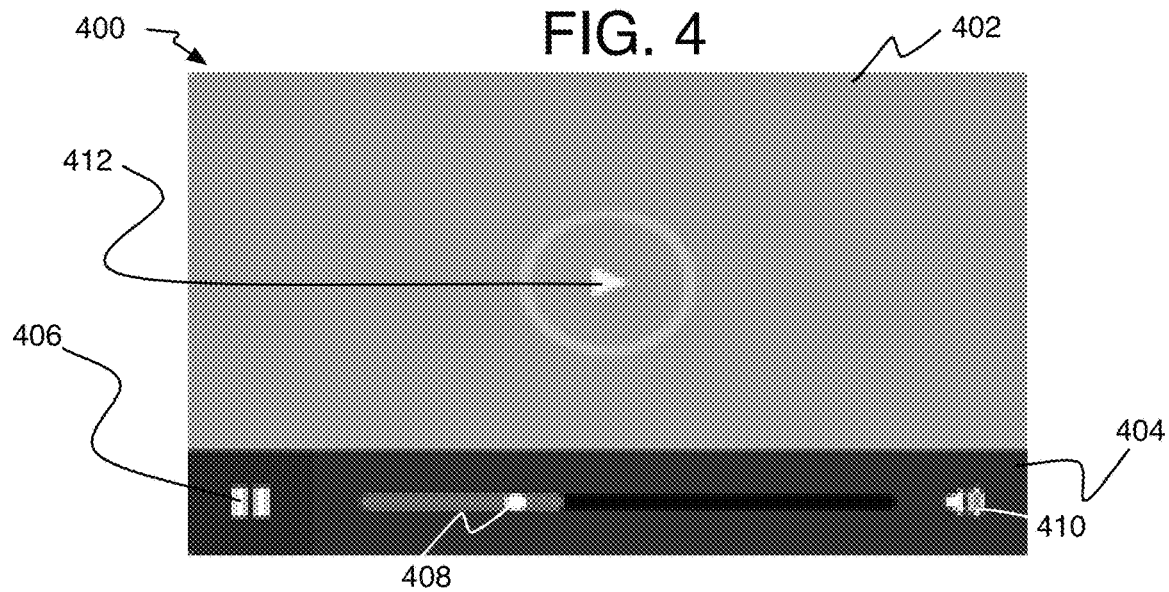

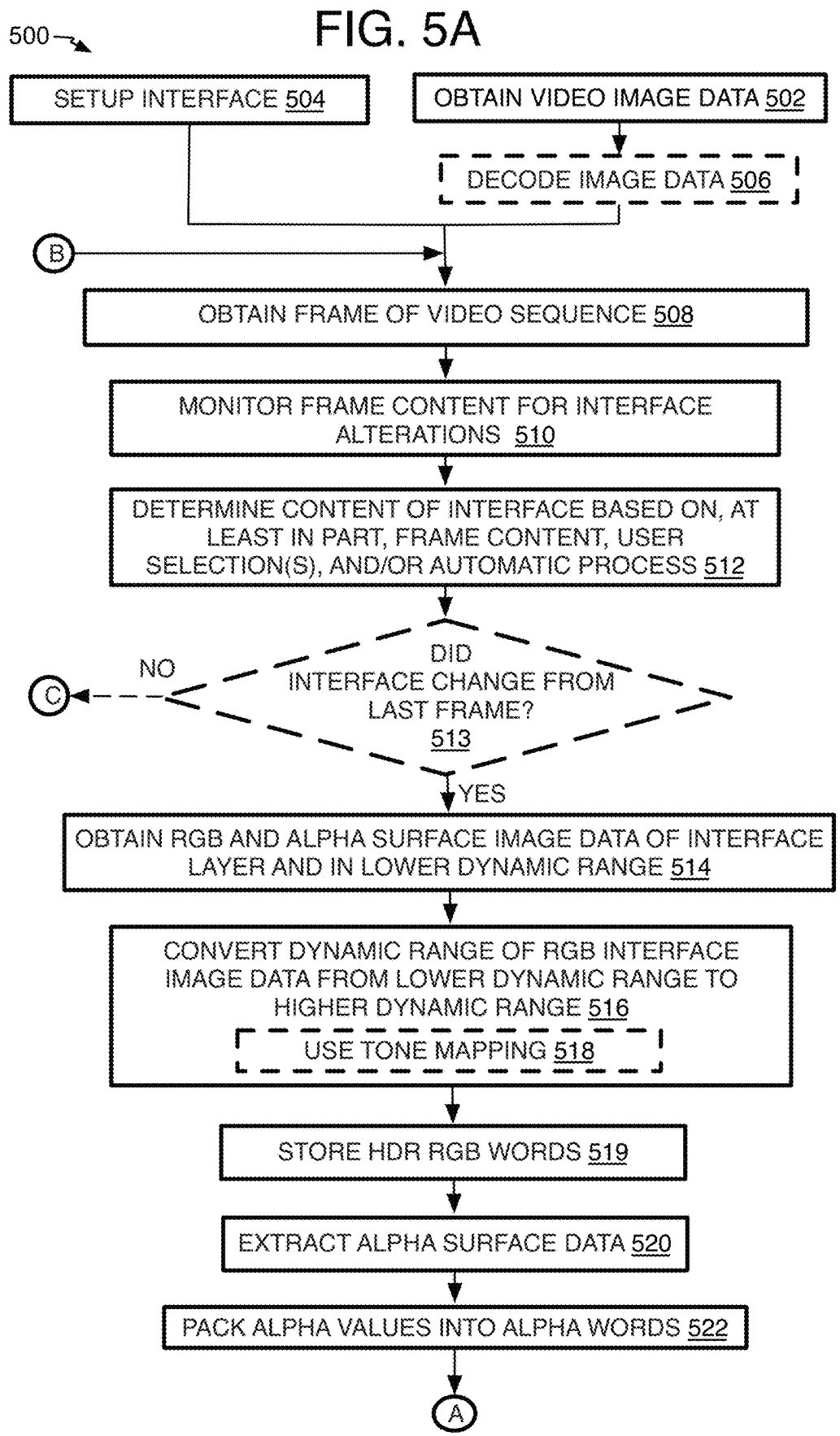

METHOD AND SYSTEM OF MULTI-DYNAMIC RANGE MULTI-LAYER VIDEO BLENDING WITH ALPHA CHANNEL SIDEBAND FOR VIDEO PLAYBACK

CLAIM OF PRIORITY

This Application is a National Stage Entry of, and claims priority to, PCT Application No. PCT/CN16/87263, filed on Jun. 27, 2016 and titled "METHOD AND SYSTEM OF MULTI-DYNAMIC RANGE MULTI-LAYER VIDEO BLENDING WITH ALPHA CHANNEL SIDEBAND FOR VIDEO PLAYBACK", which is incorporated by reference in its entirety for all purposes.

BACKGROUND

Video playback on screens that include both the video and a computer interface forming a frame around the video being played, such as with a video playback application for example, are very common. With the advent of very high quality images, one of the video planes (or layers) may be provided in a high quality format such as high dynamic range (HDR) while the user interface layer may be provided in a lower quality format such as standard dynamic range (SDR). HDR video playback is very popular and is fast becoming the model for mainstream visual media. Compared to SDR, HDR is often used in imaging and photography to reproduce a greater dynamic range of luminosity. HDR can provide a much greater range of luminance levels covering many real-world scenes containing very bright, direct sunlight to extreme dark or very faint nebulae. Thus, while SDR provides 256 luminance levels from darkest to brightest for each red, green, and blue (RGB) channel and uses eight bits per channel, HDR may provide at least 1024 luminance levels in ten bits for each channel. When an SDR interface layer and HDR video or other content layer of an image are parts of the same image, the two parts are overlaid or blended together to provide image pixel data of a single composite layer or image.

Difficulty arises when the image data for each pixel also includes an alpha (A) value which refers to a value that indicates the transparency level of the pixel. This may be used, for example, when the interface has features that overlay the video but are at least somewhat transparent so that the video underneath can be seen through the features of the interface. This may include a play button or a pause button placed over the middle of the video for example. This RGBA color space or model is often provided in SDR with 8 bits per channel to provide a 32 bit word that can be aligned in memory whether cache, RAM, or other memory. To blend the two layers, the SDR layer is first converted to HDR. This, however, causes a difficulty since the RGB channels now need 10 bits each and there is insufficient space for the full 8-bit alpha value in the 32 bit word. To resolve this issue, either the alpha value is reduced to two bits so that a 10/10/10/2 bit scheme is provided to fill the 32 bit value which reduces the alpha fidelity and in turn the quality of the image, or a RGB16 format is provided where each of the RGBA channels is provided with a 16 bit value, increasing the bit size to 64 bits per pixel, which consumes a very large memory bandwidth to perform the blending of the two formats. Neither option is acceptable.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, where considered appropriate, reference labels have been repeated among the figures to indicate corresponding or analogous elements. In the figures:

FIG. 3 is a flow chart of a method of multi-dynamic range multi-video blending with alpha sideband for video playback according to the implementations herein;

FIG. 4 is another flow chart of a method of multi-dynamic range multi-layer video blending with alpha sideband for video playback according to the implementations herein;

FIGS. 5A-5B is another flow chart of a method of multi-dynamic range multi-layer video blending with alpha sideband for video playback according to the implementations herein;

DETAILED DESCRIPTION

Figures 1, 2:
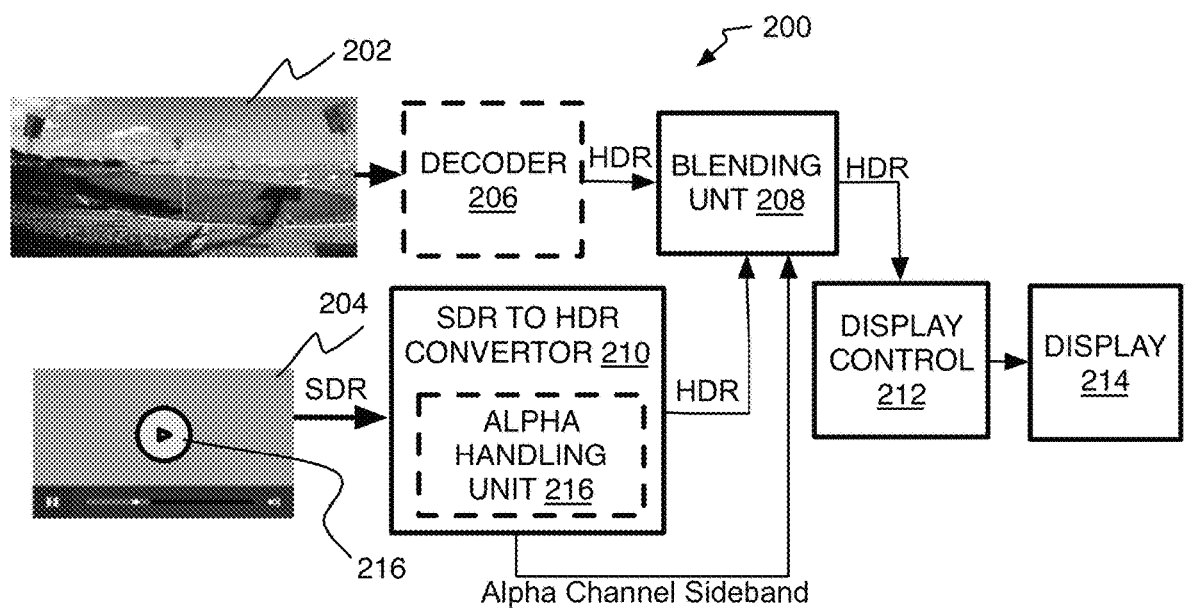
FIG. 1 is an image of a frame showing a video within a user interface according to the implementations herein.
FIG. 2 is a schematic diagram of a video playback system according to the implementations herein.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Furthermore, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof unless specified herein. The material disclosed herein also may be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Furthermore, when a particular feature, structure, or characteristic is described in connection with an implementation, it is submitted that it is within the knowledge of one skilled in the art to effect such feature, structure, or characteristic in connection with other implementations whether or not explicitly described herein.

Systems, articles, and methods are described below related to multi-dynamic range multi-layer video blending with alpha sideband for video playback according to the implementations herein.

Referring to FIG. 1, and as mentioned above, it may be desirable to provide an application interface in standard dynamic range (SDR) and that forms a frame, window, or border around a screen or image, while providing a video or other content in high dynamic range (HDR) within the interface. Image 100 shows an application interface (or interface layer) 102 with top and bottom borders provided in SDR and around a video (or video layer or other content) 104 provided in HDR. It will be understood that the video 104 may need to provide great contrasts in luminosity to provide a high quality user viewing experience, while the interface 102 may have a very small or zero change in luminosity from frame to frame (in this context also referred to as an image or picture). By one example, the image 100 may provide the video layer 104 in a color format of HDR BT2020 P010/P016 (referring to either 10 or 16 bits per channel) and the interface layer 102 is provided in color format of SDR ABGR8888 (referring to 8 bits per channel). BT2020 refers to the International Telecommunication Union Recommendation (ITU-R) BT.2020, also referred to as Rec. 2020 or BT.2020, and defines various aspects such as display resolution, frame rate, chroma subsampling, bit depth, and color space.

The SDR ABGR8888 format includes an alpha channel that provides a per-pixel percentage or ratio value A that indicates the transparency of the pixel. By one form, the alpha range may be from zero referring to fully transparent or invisible, to 1 referring to fully opaque as in the "normal" pixels so that such a pixel will fully cover and hide what other content or layer is considered to be underneath that pixel. This provides the ability to show see-through glass, or as mentioned, to have somewhat transparent activation buttons placed over the video such as a play, stop, or pause button to name a few examples when a screen is a touch-sensitive screen for example. Many other uses for multi-layer images with a video layer exist including enhancements, text or graphics placed on or around the video, and so forth. Thus, while the video layer may be a first layer, a second layer may be an interface as used in the examples here but could be other content.

Also as mentioned, to provide the HDR content with the extended luminosity range and precision and more grey tones, the RGB channels are each provided in at least 10 bit values (by one form, either 10 or 16 bit values), while SDR RGB values are 8 bits each. Thus, each dynamic range needs a different storage layout. This becomes important because the SDR layer must be converted into HDR in order for the SDR interface layer to be blended with the HDR video layer to form a single composite layer or image for display of the image. Without such conversion, white values in SDR may be interpreted as extremely bright white in HDR, which may cause an undesirable user experience (UX). Proper conversion using tone mapping from the SDR format to the HDR format to change 8-bit RGB values to 10-bit RGB values is used. Once the image data in SDR format is converted to HDR format, then the conventional pipeline blends the interface layer and the video layer into a single image so that the image can be displayed.

Also, the memory footprint of the RGBA data for each pixel should be 32 bit aligned to obtain the highest memory access efficiency. Specifically, many memories store data in 32 bit words so that reading data from the memory and writing data to the memory in 32 bit words is the most efficient. In SDR, the image data values of four channels each at 8 bits fits perfectly in the 32 bit word. In HDR, however, the channels are each 10 bits and there is insufficient space for all four channels including all three RGB channels and an alpha channel in the 32 bit word.

One conventional way to balance these two factors while maintaining a 32 bit word is to use 10 bits each for the RGB channels, and then only use the 2 bits of the 8 bit alpha channel value to indicate four different binary transparency levels (11, 10, 01, 00). This is referred to as a RGB1010102 format. This, of course, causes alpha fidelity loss resulting in noticeable quality loss after the blending of the two layers.

Another way to resolve this is to use RGB16 format where each channel including the alpha channel has a 16 bit value for a total of 64 bits per HDR pixel, and this may be a floating point value. While this solves the problem of accuracy by providing the full value for each channel including the 8-bit alpha channel, and could be used with 32 bit alignment by placing two values in each 32 bit word, it would consume double the memory bandwidth compared to that of the RGB 1010102 format. Particularly, in 2160P (pixel width) video playback at 30 fps (frames per second), the SDR to HDR conversion and the following blending stage would consume 2 GB/s (gigabytes/second) for both reading and writing memory bandwidth more than the RGB 1010102 format, and in 4320P playback at 30 fps, another 8 GB/s read and write memory bandwidth would be used over that used by the RGB1010102 format.

To resolve these issues, an alpha channel sideband is used to transmit the alpha surface between a memory and a processor performing image processing such as the blending. Particularly, the sideband will carry 32-bit words that are packed with 8-bit alpha surface values for multiple pixels of a frame extracted before the blending of the interface and video layers. The RGB 10 bit channels will be transmitted in 32-bit words on a main band separate from the alpha channel sideband. The main band words will be provided in RGB1010102 except the two extra bits are now empty. This arrangement maintains the 32-bit word format while preserving the full 8-bit alpha values to provide just as good a quality image as RGB16 format after blending but also while merely transmitting 40 bits of RGBA data for each pixel rather than the 64 bits per pixel with RGB16 format, saving 37.5% memory bandwidth. This arrangement is still easily performed by existing graphics processing unit (GPU) pipelines.

Referring to FIG. 2, an example image or video processing system (or playback device) 200 may be used to perform the methods of multi-dynamic range multi-layer video blending with an alpha channel sideband for video playback as described herein. The system 200 may receive image data of a video sequence formed of video frames where the image data of each video frame (or video layer) 202 includes RGB or YUV values, and by one form in a higher dynamic range such as HDR. This is separate image data from the interface layer 204 of an application, such as a video playback application already on the system 200 as described below. The video layer 202 may be obtained from memory or a camera where decoding is not necessary, but otherwise may be streamed in a compressed format such as high efficiency video coding (HEVC), VP9, or other video coding standards, and to the system 200 whether streamed wirelessly or by wire.

When the video layer is received in a compressed state, the video processing system 200 may include a decoder 206. The decoder 206 may perform de-entropy coding, inverse quantization, inverse transforming, and intra and inter prediction mode to reconstruct the video frames. The result is a video sequence of decompressed frames where the image data of each frame may include HDR pixel values. By one example, the decoder 206 may provide YUV image data converted to RGB HDR image data in BT2020 standard format with P010/P016 (either 10 or 16 bits per R, G, B color channel and per pixel). This data is then stored in memory and provided to a blending unit 208.

It will be appreciated that some systems actually convert HDR data to SDR for encoding and then decoding. In this case, a compressed SDR video could be provided to the decoder, and once decoded, the decoder may have its own SDR to HDR convertor to convert the video image data back to HDR before providing the video image data to a blending unit 208. The examples herein, however, will assume the video is provided in HDR to the decoder if it is used.

On the application interface side, an application such as a video player may provide a user interface to view and control the playing of the video on the application and within the interface 204. There is no limit to the type of application that is providing the interface and may be server based or website based such as YouTube for example where the player is downloaded temporarily, or may be client based or stored locally such as Windows® Media Player. By one example form, the interface is generated by the application, and may have image data provided in SDR BT709 ABGR8888 format to form the SDR interface layer by one possible example.

The SDR to HDR convertor 210 then may use tone mapping to convert the SDR interface RGB surfaces into HDR interface RGB surfaces. Herein, the term surface refers to a single class or type of data in an image such as a surface for each color and alpha channel, although the RGB channels may collectively be referred to as a single RGB surface to differentiate from the alpha surface. Tone mapping converts the RGB 8-bit values each to 10 bit value precision. This may be performed by a number of different algorithms. Common tone mapping techniques include global (or spatially uniform) techniques or local (or spatially varying) techniques that need not be described in detail here. The resulting converted image data may be provided in HDR BT2020 standard format with 32-bit aligned words in RGB1010102 format where the extra 2 bits are empty. This data may be stored in an RGB buffer for interface image data awaiting blending with the video layer.

The alpha handling unit 216 extracts the 8-bit alpha values from the ABGR8888 words provided to the SDR to HDR convertor 210. The alpha handling unit 216 may or may not be considered a part of the SDR to HDR convertor 210, and may perform these tasks, before, during, or while the SDR RGB values are being converted to HDR. As described in greater detail below, the alpha handling unit 216 places the extracted 8-bit alpha surface values from the ABGR8888 words and packs them one by one into 32-bit alpha words so that four alpha values for four pixels are placed in each 32-bit word. The last alpha word in a frame may be padded if less than four alpha surface values are remaining to be packed. These alpha words holding the alpha surface image data are then stored in an alpha buffer by one example.

The blending unit 208 obtains the RGB HDR surface image data from the RGB buffer establishing a main band, the alpha surface image data from the alpha buffer establishing the alpha channel sideband, and the video image data from memory. As described above, this results in a transmission of 40 bits of RGBA interface image data per pixel to the blending unit 208 while providing the entire 8-bit alpha surface pixel values and much less memory bandwidth than the RGB16 format of 64 bits per pixel. The blending unit 208 then applies blending or compositing algorithms, filters, and/or interpolation techniques to generate a composite layer or image that merges the video layer and the interface layer. Such blending may include alpha blending as disclosed by /en.wikipedia.org/wiki/Alpha_compositing#Alpha_blending as of the filing date of the application.

Thereafter, a display control 212 may display the composite image on a display 214, or otherwise, the composite image may be stored for later viewing or may be provided to an encoder for transmission to another device for viewing the composite image.

In some examples, video processing system 200 may include additional items that have not been shown in FIG. 2 for the sake of clarity. For example, video processing system 200 may include a processor, a radio frequency-type (RF) transceiver, splitter and/or multiplexor, and/or an antenna. Further, video processing system 200 may include additional items such as a speaker, a microphone, an accelerometer, memory, a router, network interface logic, and so forth. Such implementations are shown with system 700, 800, and/or 900 described below.

As used herein, the term "coder" may refer to an encoder and/or a decoder. Similarly, as used herein, the term "coding" may refer to encoding via an encoder and/or decoding via a decoder. A coder, encoder, or decoder may have components of both an encoder and decoder.

Referring to FIG. 3, an example process 300 is arranged in accordance with at least some implementations of the present disclosure. In general, process 300 may provide a computer-implemented method of multi-dynamic range multi-layer video blending with alpha channel sideband for video playback. In the illustrated implementation, process 300 may include one or more operations, functions or actions as illustrated by one or more of operations 302 to 312 numbered evenly. By way of non-limiting example, process 300 may be described herein with reference to operations discussed with respect to example systems 200, 700, 800, or 900 of FIGS. 2 and 7-9 respectively, and where relevant.

Process 300 may include "obtain first image pixel data of at least a portion of an image" 302, and as mentioned above, image data in the form of frames of a video sequence may be obtained. The portion of the image here may be considered a video layer that is to be merged with a second or more layers of the image such as the interface (such as a video player), although it could be merged with other layers of other image data such as explanatory text or other graphics placed over or around the video layer for example. Many different examples are possible. In one form, the video layer is provided in HDR BT2020 in either 10, 12, or 16 bits per pixel for each RGB color channel (although other bit depths could be used). When decoding is provided in YUV color space, the data may have been converted to RGB for blending. Thus, the image data of the frame may have been pre-processed, decoded, and post-processed, and is ready for blending with other image data layers or surfaces. Other details are provided below.

Process 300 may include "obtain second image pixel data of the image having pixel data of multiple color channels from a main band used to transmit the second image pixel data" 304. Here, the second image pixel data may refer to HDR RGB image data or surface of the interface layer. To obtain the HDR RGB surface, the interface layer may have been first provided in SDR and then converted to HDR. As described herein, when provided in SDR ABGR8888 format for 32 bit aligned words, the conversion results in RGB1010102 format where 10 bits are provided for each RGB color and the last two bits are kept empty for 32 bits total stored in 32-bit aligned HDR RGB words to be used to form a main band for blending (or other purposes).

Process 300 may include "obtain transparency-related alpha data associated with the pixels of the second image pixel data" 306. As mentioned, when the interface is provided in SDR ABGR8888 format, the alpha value A can be extracted from the SDR interface layer image data.

This also may be considered to include providing the alpha data in words separate from the words of the second image pixel data. Also as mentioned, to preserve the full 8-bit alpha surface values from the ABGR8888 interface layer data, the alpha values are extracted and packed into 32-bit aligned alpha words four alpha values per 32-bit word, separate from the HDR RGB words, and may be stored.

When the alpha words are retrieved from memory for blending or other purposes, process 300 may include "wherein the alpha data forms an alpha channel sideband used to transmit the alpha data separate from the main band" 308, thereby preserving the full 8-bit alpha surface values. The alpha channel sideband being established to transmit the alpha values from memory to one or more processors for blending with other layers or other tasks by the processor.

Process 300 may include "provide the first image pixel data, the second image pixel data from the main band, and the alpha data from the alpha channel sideband to be blended to form a composite layer to be used to display the image" 310. Thus, the main sideband provides the RGB surface of the interface layer while the alpha channel sideband provides the alpha surface of the interface layer. The interface layer with the two surfaces are then blended with the video image data forming the video layer.

As structured, a mere 40 bits per pixel are transmitted to a blending unit including 32 bits of the RGB surface and the 8 bits of the alpha surface per pixel. Thus, this arrangement avoids the drop in alpha fidelity to 2 bits from cramming the alpha values into a single 32-bit word with the RGB values, and avoids consuming too much memory bandwidth by avoiding the use of the 64 bits per pixel RGBA16 format. Thus, this solution reaches a good compromise.

Figure 5B:
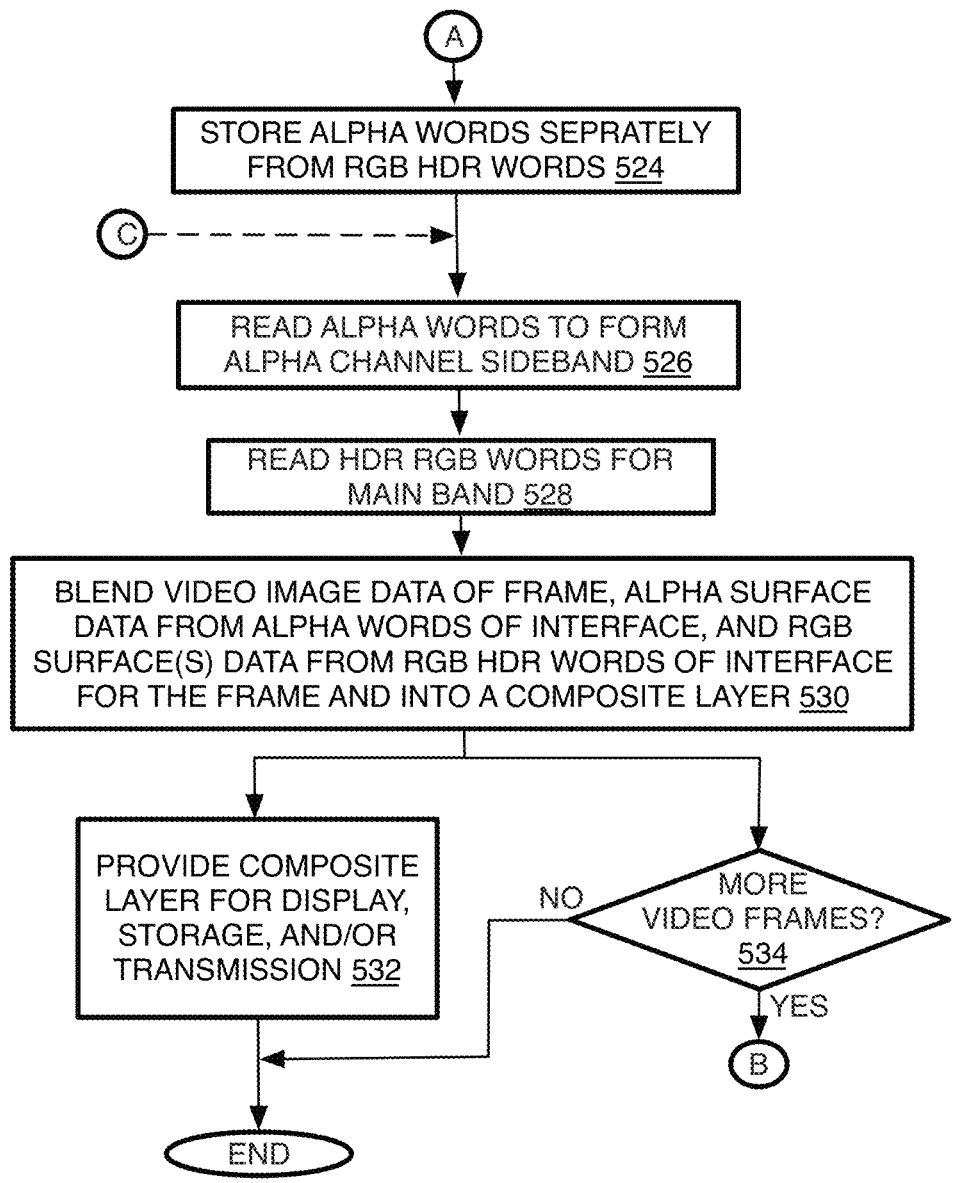

Referring now to FIGS. 5A-5B, a detailed example post-processing indication process 500 is arranged in accordance with at least some implementations of the present disclosure. In general, process 500 may provide a computer-implemented method of multi-dynamic range multi-layer video blending with alpha channel sideband for video playback. In the illustrated implementation, process 500 may include one or more operations, functions or actions as illustrated by one or more of operations 502 to 534 numbered evenly. By way of non-limiting example, process 500 will be described herein with reference to operations discussed with respect to example systems 200 and 700-900 of FIGS. 2 and 7-9 respectively, and where relevant.

Process 500 may include "obtain video image data" 502, and as mentioned, obtaining image data of frames of a video sequence forming the video layer. The video may be streamed from another device with an encoder, and may be provided in a compressed form so that decoding is needed before the video layer can be blended with other layers. By alternative examples, the video may be obtained from a camera, and the blending may be performed on the camera, or otherwise the video may be provided in non-compressed form from a memory on the same device performing the blending.

Process 500 may include "setup interface" 504, where an application generates a second or interface layer. By one form, the application generates SDR ABGR8888 format 32-bit aligned words for each pixel, where each 8 refers to 8-bit value per pixel and per color and alpha channel. It be understood that the present methods are applicable to any of the combinations using R, G, B, and A. Thus, the SDR words may be in byte-order where bits are counted from 0 to 31 or 31 to 0 to indicate the memory address of each byte, or may be in word-order which ranks the bytes from most important to least important (or vice-versa) depending on whether the word is big-endian or little endian. Some common combinations include RGBA, BGRA, ABGR, and ARGB. Any combination of R, G, B, A with initially 8-bit values for each channel may be used whether mentioned here or not.

It will be understood that instead of an interface, a different or second image layer with a different function, such as explanatory text overlaying the video layer for example could be used. For the example here, a video player interface 400 is being used for this process and to play the video of the video layer, such as the video 202 (FIG. 2).

Referring to FIG. 4, the second layer, or video player interface in this case, may have visual features on it that can change from frame to frame such that the interface data may need to be updated, and the same interface data cannot necessarily be used for all frames to be used for a video sequence. Thus, for example, the interface 400 provides a video area 402 and a border area 404 shown on one side of the frame but could be more or other sides. This interface border area 404 has an activation button 406 shown to be on pause but could change to show a play triangle, a stop square, or other indicators. A progress slide 408 is shown and usually adjustable by a user to forward or reverse the video being played, and a volume indicator 410 which provides more lines with more decibels being emitted. The middle of the video area 402 may have a partially transparent activation button 412 shown to be a play button, but also could change to show pause or other functions. These and other functions, such as time tracking of the video, screen size button, and settings or other pull-down/pop-up menu buttons (some of which shown on the interface of screen 100 (FIG. 1) may change while the video is being played in the video area 402 of the interface 400. Thus, the same interface data cannot necessarily be used for multiple frames of a video sequence and must be updated as these features change to show the user the current state of these features. The application providing the interface or second layer will provide or setup the interface layer image data that is to be displayed at a certain time relative to the frames of the video sequence, and according to the settings or other modification of the second or interface layer.

Process 500 optionally may include "decode image data" 506, and operates when the video data (video layer) is provided in a compressed form. The operation of the decoder was mentioned above and need not all be repeated here except to say that the video layer may be provided in YUV color space and may be converted to RGB color space before being provided to the blending unit or other unit for use of the video layer.

Also, one example strategy that is being used is to convert HDR data to SDR data for encoding and decoding, and then converting the SDR data back to HDR data after decoding. Thus, the image processing device that provides playback actually may receive video image data in compressed SDR format even though the decoder converts the format back to HDR after decoding. Either way, for the present example, the decoding may result in de-compressed HDR BT2020 data in P010, P016, or RGB16 format, but could be other per pixel bit depths such as 12 bits per pixel.

Process 500 may include "obtain frame of video sequence" 508, and in other words, the image data or video layer may be obtained from volatile memory or RAM for example frame-by-frame, and starts with a first frame of a video sequence.

Process 500 may include "monitor frame content for interface alterations" 510, and is performed to determine the content of the interface layer for the current frame. Additionally, the results here may be used to determine whether the interface or second layer has any changes, similar to determining if a skip is possible as with video coding. These changes may be initiated by user selection on the visual features of the application or interface as described above, but could also be performed automatically, such as a change in size or position of the interface layer and within a frame, advertising or other informative text or graphics placed off to the side or over the video area of the interface layer. Many different examples that may be considered part of the interface or second layer can be contemplated. Thus, once any alterations are detected, process 500 may include "determine content of interface based on, at least in part, frame content, user selection(s), and/or automatic process" 512, which refers to setting the image data for the current interface layer including any user or automatic changes being set on the initial frame (or interface or second layer) content or previous frame content.

Process 500 optionally may include a query "did interface change from last frame" 513, and when the current frame is not the first frame, and if no changes took place in the interface layer from the previous frame, in this case process 500 may skip the SDR to HDR conversion, and proceed to operation 526 to use the previously stored HDR words and alpha words from the previous frame and establishing the main band and the alpha channel sideband from the previous frame.

By other alternatives, there is no query, and every frame (or some set interval of frames) of the interface or second layer is converted from SDR to HDR and the alpha surface values are extracted from the SDR interface or second layer image data regardless of whether or not the second or interface layer was changing from frame to frame.

Process 500 may include "obtain RGB and alpha surface image data of interface layer and in lower dynamic range" 514, and as mentioned as generated by the interface or second layer application in SDR ABGR8888 format that includes both the RGB color channels and the alpha surface channel.

Process 500 may include "convert dynamic range of RGB interface image data from lower dynamic range to higher dynamic range" 516, and also as mentioned above, by using tone mapping techniques that convert the 8-bit RGB color channel values into 10-bit HDR color channel values. As above mentioned, process 500 may include "use tone mapping" 518, and global (or spatially uniform) techniques or local (or spatially varying) techniques as men may be used.

Process 500 then may include "store HDR RGB words" 519, and the RGB values for a pixel are packed into a 32-bit aligned word in 10/10/10/2 order where the last two bits of the word are empty. Then, the HDR RGB words of the RGB surface(s) of the interface or second layer are stored in a memory or RGB buffer until needed for blending.

Process 500 may include "extract alpha surface data" 520, and now the 8-bit values are extracted from the initial SDR ABGR8888 words. An alpha handling unit, whether or not considered part of the SDR to HDR convertor, may determine the address of the alpha surface value within the 32-bit value, and then move or copy that value. For this purpose, process 500 may include "pack alpha values into alpha words" 522, so that the extracted alpha surface value is placed in the 32-bit aligned word (herein referred to as the alpha word), and by one form, alpha value after alpha value for multiple pixels until the 32 bit word is full with four alpha surface values, and the next word is then packed. The 32-bit word may be packed pixel by pixel in raster order of the interface or second layer areas of the image for example or by some other efficient or functional order. The last word of a frame may be padded when there is not an even four alpha surface values. Such stream splitting may be handled by GPU hardware.

Process 500 may include "store alpha words separately from RGB HDR words" 524, such that the packed 32-bit aligned alpha words are stored separately from the HDR RGB words (by this example, there are no words with both RGB values and HDR values). By one form, the alpha words and the HDR RGB words each have their own buffer. By one example form, the size of the main band should be 4*picture width*picture height, while the size of the sideband should be larger than the area of the image (picture width*picture height) all units being bytes.

Process 500 may include "read alpha words to form alpha channel sideband" 526, and reading the alpha words to establish the alpha channel sideband providing the alpha words for blending or other tasks.

Process 500 may include "read HDR RGB words for main band" 528, and to establish the main band bringing the HDR RGB words to the blending unit as well or to another unit for processing. The main band does not transmit the alpha surface data which is performed by the alpha channel sideband instead.

Process 500 may include "blend video image data of frame, alpha surface data from alpha words of interface, and RGB surface(s) data from RGB HDR words of interface for the frame and into a composite layer" 530, and as mentioned above by known blending techniques such as those mentioned above.

Process 500 may include "provide composite layer for display, storage, and/or transmission" 532. The blending results in a composite layer which may be a single layer with RGBA channel data for each pixel in the layer and that has the appropriate content showing parts of the first image or video layer or the interface or second layer and while factoring in the transparency of the pixels in at least the second or interface layer.

Process 500 may include a query "more video frames?" 534. If not, the process has ended for this video sequence. If so, the process loops to operation 508 to obtain the data of the next video layer or frame, and the content of the next interface layer for the same frame. This repeats until the video sequence has ended.

The present method results in a significant improvement. From a quality perspective, since the per pixel 8-bits alpha information in the sideband surface is kept unchanged from the original ABGR 8888 format, there will be no quality loss during the blending stage. From a performance perspective, the sideband alpha surface will be generated in SDR to HDR tone mapping as one side product, and consumed by the blending stage in parallel with the main band RGB1010102 surface of the interface or second layer. Considering a GPU is highly optimized for parallel operation, there will be no or little performance impact brought by this sideband alpha surface. For the memory bandwidth savings, based on this solution, each pixel of the HDR based UI layer takes 40 bits, while RGB16 format spends 64 bits per pixel. In another word, compared to the RGB16 solution, the sideband alpha surface solution using 40 bits per pixel can save 37.5% of the total memory bandwidth with the same visual quality, which is about 1.5 GB/s savings with 2160PA30 fps HDR playback, and about 6 GB/s savings with 4320PA30 fps HDR playback case.

Since the present method of using an alpha surface sideband permits the video layer to be presented in HDR RGB1010102 rather than RGB16 while providing the same quality of images, the memory savings between these two formats during coding also is considerable. For example, in the case of an AVC decoder, the hardware generated motion vector (MV) and mode information takes 64 bytes for each macroblock (MB). Thus, comparing the RGB16 format to the RGB10101012 format, the savings during decoding and encoding such video data are as follows. While performing an MV/mode buffer solution: in 2160PA60 fps transcoding case, the embedded MV/mode solution can save 120 MB/s write bandwidth (for the decoding session), and 120*N MB/s read bandwidth (120 MB/s for each encoding session) than that consumed when the RGB16 format is used. In 4320PA60 fps transcoding case, the present method can save 480 MB/s write bandwidth for the decoding session, and 480*N MB/s read bandwidth for an encoding session (480 MB/s for each encoding session) compared to when the RGB16 format is used.

Figure 6:
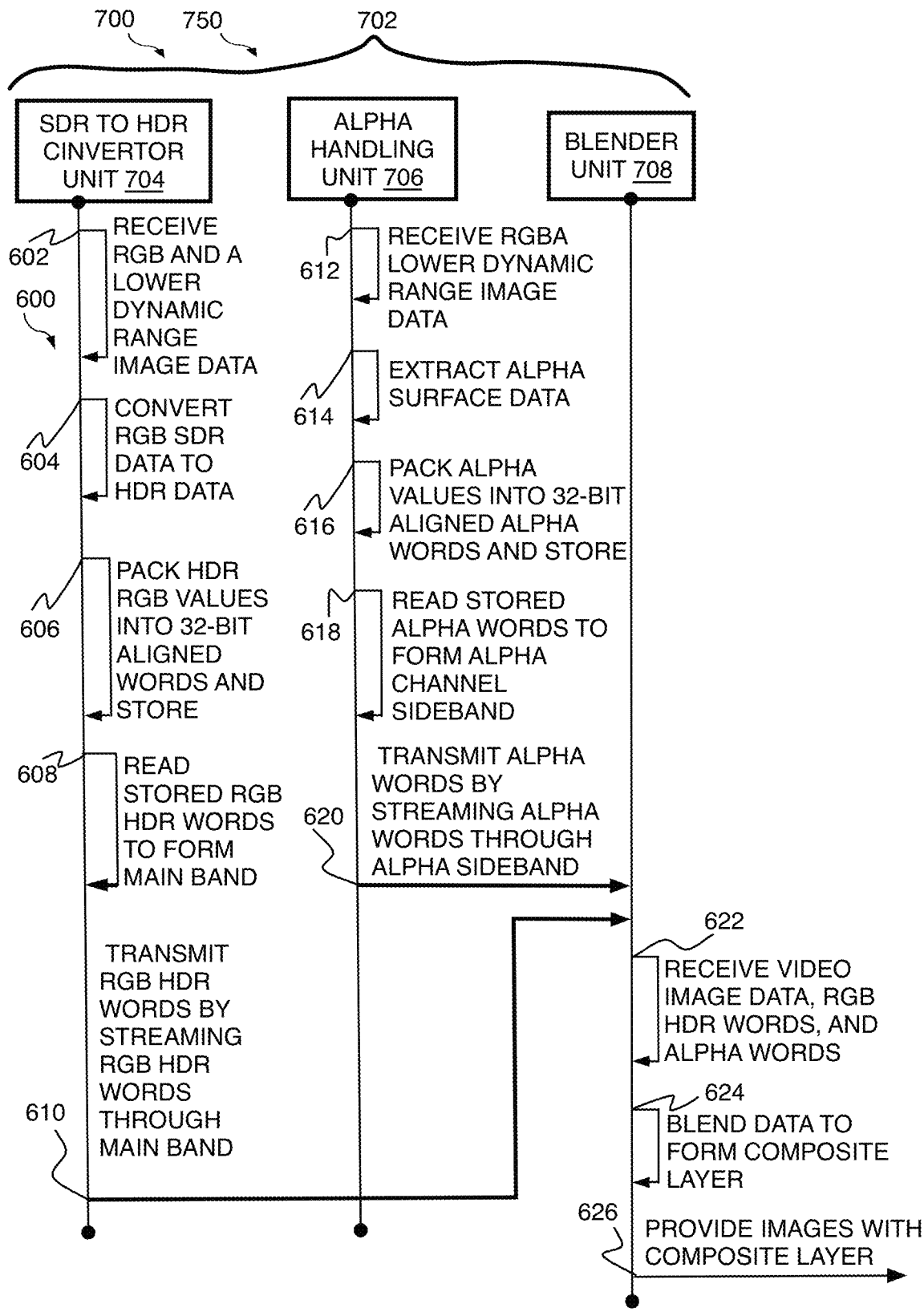
FIG. 6 is an illustrative diagram of an example system in operation for providing a method of multi-dynamic range multi-layer video blending with alpha sideband for video playback according to the implementations herein.

Referring now to FIG. 6, an image processing system 700 may be used for an example process 600 of multi-dynamic range multi-layer video blending with alpha channel sideband for video playback shown in operation, and arranged in accordance with at least some implementations of the present disclosure. In the illustrated implementation, process 600 may include one or more operations, functions, or actions as illustrated by one or more of actions 602 to 626 numbered evenly, and used alternatively or in any combination. By way of non-limiting example, process 600 will be described herein with reference to operations discussed with respect to any of the implementations described herein where relevant.

In the illustrated implementation, each system 700 may include a processing unit(s) 720 with logic units or logic circuitry or modules 750, the like, and/or combinations thereof. For one example, logic circuitry or modules 750 may include a multi-layer blending module 702 with an SDR to HDR convertor unit 704, alpha handling unit 706, and blender unit 708. As explained below, the alpha unit 706 loads alpha data into an alpha channel sideband between processor(s) 703 operating the multi-layer blending module 702 and alpha buffer(s) 716 in memory store(s) 706. The details are provided herein. Although process 600, as shown in FIG. 6, may include one particular set of operations or actions associated with particular modules or units, these operations or actions may be associated with different modules than the particular module or unit illustrated here.

Process 600 may include "receive RGB and A lower dynamic range image data" 602. This is described above as receiving SDR ABGR8888 data of an interface or second layer, although the RGB and A channels may be received in words that combine the RGB and A channels in various ways.

Process 600 may include "convert RGB SDR data to HDR data" 604. As mentioned above, tone mapping or other techniques may be used to convert the RGB channel or surface data from 8-bit values to 10-bit HDR values per channel and per pixel.

Process 600 may include "pack HDR RGB values into 32-bit aligned words and store" 606, and pack the HDR RGB channel or surface into 32-bit aligned 10/10/10/2 format where the two extra bits are empty or could be used for other purposes. These HDR RGB words then may be stored in an RGB buffer separately from the alpha words.

Process 600 may include "read stored RGB HDR words to form main band" 608, and the HDR RGB words are read from the buffer to establish the main band that provides the HDR RGB words for blending or other tasks. Thus, process 600 then may include "transmit RGB HDR words by streaming RGB HDR words through main band" 610, and to a blending unit. Other details are provided above.

Process 600 may include "receive RGBA lower dynamic range image data" 612, and by an alpha handling unit that may or may not be considered part of the SDR to HDR convertor. The alpha handling unit may be considered to include those units, modules, coding, programs, or applications that perform the tasks of such an alpha handling unit including memory transaction control units. In light of this, process 600 then may include "extract alpha surface data" 614, which may comprise determining the alpha surface value address in the SDR 32-bit RGBA combination word generated by the interface or second layer application.

The alpha data is then moved or copied so that the process 600 then may include "pack alpha values into 32-bit aligned alpha words and store" 616. As explained above, once the 8-bit alpha surface value is extracted, it may be placed in a 32-bit aligned word, alpha value by alpha value until four alpha values fill the alpha word. The alpha words may be filled in any logical order as the alpha values are extracted. Once filled, the alpha word is stored in an alpha buffer in memory such as RAM.

Process 600 may include "read stored alpha words to form alpha channel sideband" 618. Also as mentioned above, reading the alpha words establishes the alpha channel sideband so that the process 600 may include "transmit alpha words by streaming alpha words through alpha channel sideband" 620. This includes transmitting the alpha words from the buffer or memory and to a processor(s) that will perform the blending or other tasks with the alpha words.

Process 600 may include "receive video image data, RGB HDR words, and alpha words" 622, and then may include "blend data to form composite layer" 624, and as mentioned above, receiving the RGB HDR words through the main band, and receiving the alpha words through the alpha channel sideband. The total bandwidth on the main band and alpha channel sideband equals 40 bits per pixel which is much better than the RGB16 64 bits per pixel while providing a better quality image than the RGBA1010102 format that drops 6 of the 8 pixels of the alpha surface value.

Process 600 may include "provide images with composite layer" 626, and provide images to display, store, or further transmit the composite layer or image. The composite layer could be encoded on the present device and then decoded at another playback device as well or stored for later use on the current playback device. Many examples are available.

While implementation of example process 300, 500, and/or 600 may include the undertaking of all operations shown in the order illustrated, the present disclosure is not limited in this regard and, in various examples, implementation of any of the processes herein may include the undertaking of only a subset of the operations shown and/or in a different order than illustrated.

In implementations, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein. As mentioned previously, in another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit also may utilize a portion of software to implement its functionality.

Figure 7:
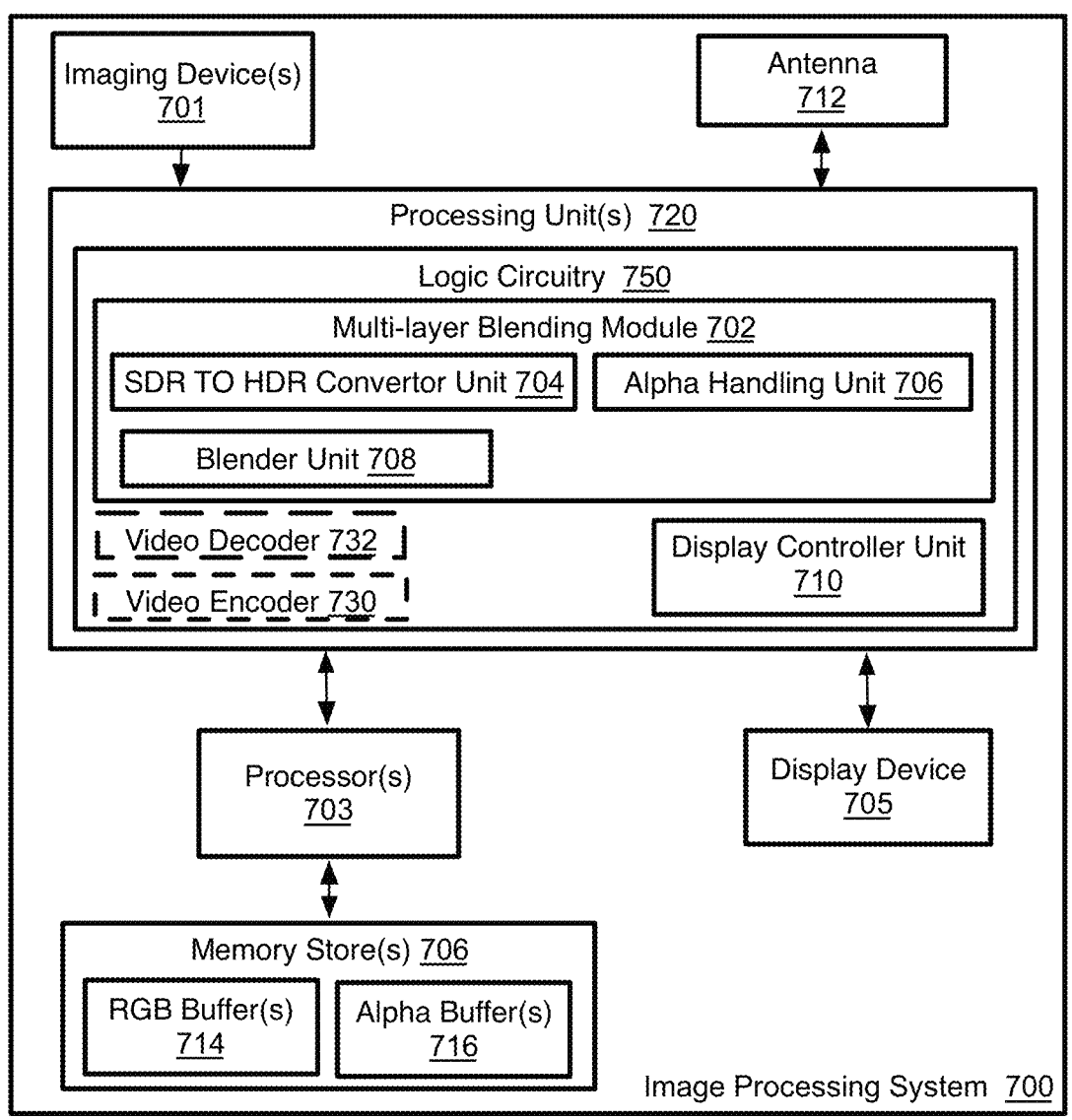
FIG. 7 is an illustrative diagram of an example system.

Referring to FIG. 7, an example image processing system 700 for providing multi-dynamic range blending with alpha channel sideband may be arranged in accordance with at least some implementations of the present disclosure. In the illustrated implementation, the system 700 may include an imaging device 701 or may be connected to a separate imaging device 701. By one form, the imaging device may be a video camera, still picture camera, or both, and the device 700 holds such a camera such as a smartphone, tablet, and so forth. By other examples, the device 700 is a camera, and the imaging device 701 is the hardware and sensors that form the image capturing components of the camera.

System 700 also may include one or more central and/or graphics processing units or processors 703, a display device 705, and one or more memory stores 706. Central processing units 703, memory store 706, and/or display device 705 may be capable of communication with one another, via, for example, a bus, wires, or other access. In various implementations, display device 705 may be integrated in system 700 or implemented separately from system 700.

The system 700 also may have an antenna 712 to receive or transmit image data, profile data, and other post-processing related data. Thus, in some cases, the imaging device 701 may not be the only source of the image data.

As shown in FIG. 7, and discussed above, the processing unit 720 may have logic circuitry 750 with a multi-layer blending unit module 702, and optionally a video encoder 730 and/or a video decoder 732. The multi-layer blending module 702 may have an SDR to HDR convertor 704, alpha handling unit 706, and blender unit 708. These components may be respectively similar to the similarly named components of system 200 on FIG. 2. It will be understood that any of these units may not be a single module or unit but may include that code or programming spread throughout a number of units or modules but that is relevant to the use and control of that component.

As will be appreciated, the modules illustrated in FIG. 7 may include a variety of software and/or hardware modules and/or modules that may be implemented via software or hardware or combinations thereof. For example, the modules may be implemented as software via processing units 720 or the modules may be implemented via a dedicated hardware portion. Furthermore, the shown memory stores 706 may be shared memory for processing units 720, for example. The RGB HDR image data may be stored in an RGB Buffer(s) 714 while the alpha channel data may be stored in the alpha buffer(s) 716 in memory 706. The memory transaction and movement of the alpha data between alpha buffer 716 and the processor(s) 703 may be considered the alpha channel sideband. This data as well as data to operate the units mentioned herein, however, may be stored on any of the options mentioned herein, or may be stored on a combination of these options, or may be stored elsewhere. Also, system 700 may be implemented in a variety of ways. For example, system 700 (excluding display device 705) may be implemented as a single chip or device having a graphics processor, a quad-core central processing unit, and/or a memory controller input/output (I/O) module. In other examples, system 700 (again excluding display device 705) may be implemented as a chipset.

Processor(s) 703 may include any suitable implementation including, for example, microprocessor(s), multicore processors, application specific integrated circuits, chip(s), chipsets, programmable logic devices, graphics cards, integrated graphics, general purpose graphics processing unit(s), or the like. In addition, memory stores 706 may include any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 706 also may be implemented via cache memory or RAM, whether on-chip or off-chip for the alpha channel sideband.

Figure 8:
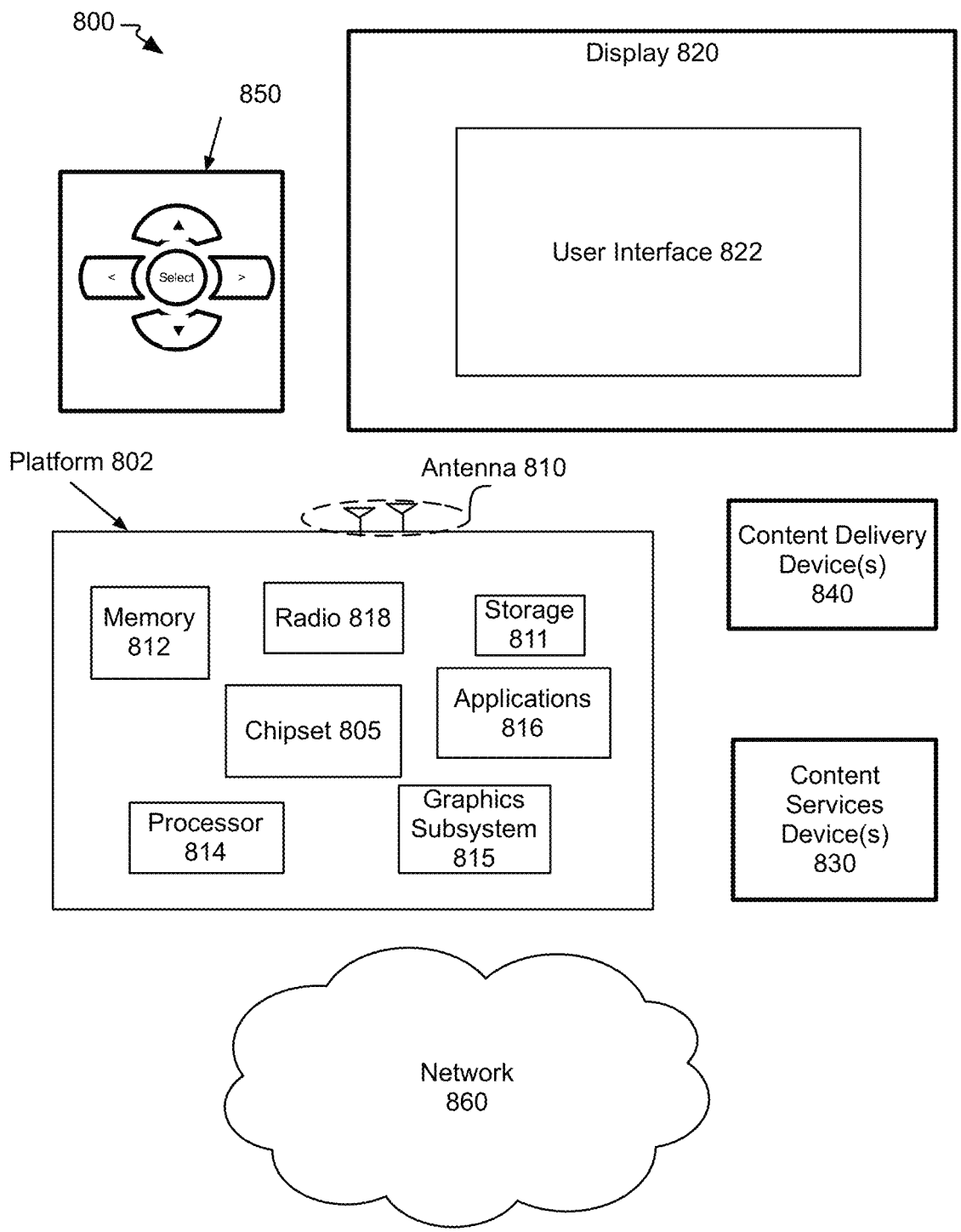
FIG. 8 is an illustrative diagram of another example system.

Referring to FIG. 8, an example system 800 in accordance with the present disclosure and various implementations, may be a media system although system 800 is not limited to this context. For example, system 800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 800 includes a platform 802 communicatively coupled to a display 820. Platform 802 may receive content from a content device such as content services device(s) 830 or content delivery device(s) 840 or other similar content sources. A navigation controller 850 including one or more navigation features may be used to interact with, for example, platform 802 and/or display 820. Each of these components is described in greater detail below.

In various implementations, platform 802 may include any combination of a chipset 805, processor 814, memory 812, storage 811, graphics subsystem 815, applications 816 and/or radio 818 as well as antenna(s) 810. Chipset 805 may provide intercommunication among processor 814, memory 812, storage 811, graphics subsystem 815, applications 816 and/or radio 818. For example, chipset 805 may include a storage adapter (not depicted) capable of providing intercommunication with storage 811.

Processor 814 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 810 may be dual-core processor(s), dual-core mobile processor(s), and so forth.

Memory 812 may be implemented as a volatile memory device such as, but not limited to, a Random Access Memory (RAM), Dynamic Random Access Memory (DRAM), or Static RAM (SRAM).

Storage 811 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 811 may include technology to increase the storage performance enhanced protection for valuable digital media when multiple hard drives are included, for example.

Graphics subsystem 815 may perform processing of images such as still or video for display. Graphics subsystem 815 may be a graphics processing unit (GPU) or a visual processing unit (VPU), for example. An analog or digital interface may be used to communicatively couple graphics subsystem 815 and display 820. For example, the interface may be any of a High-Definition Multimedia Interface, Display Port, wireless HDMI, and/or wireless HD compliant techniques. Graphics subsystem 815 may be integrated into processor 814 or chipset 805. In some implementations, graphics subsystem 815 may be a stand-alone card communicatively coupled to chipset 805.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In other implementations, the functions may be implemented in a consumer electronics device.

Radio 818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 820 may include any television type monitor or display. Display 820 may include, for example, a computer display screen, touch screen display, video monitor, television-like device, and/or a television. Display 820 may be digital and/or analog. In various implementations, display 820 may be a holographic display. Also, display 820 may be a transparent surface that may receive a visual projection. Such projections may convey various forms of information, images, and/or objects. For example, such projections may be a visual overlay for a mobile augmented reality (MAR) application. Under the control of one or more software applications 816, platform 802 may display user interface 822 on display 820.

In various implementations, content services device(s) 830 may be hosted by any national, international and/or independent service and thus accessible to platform 802 via the Internet, for example. Content services device(s) 830 may be coupled to platform 802 and/or to display 820. Platform 802 and/or content services device(s) 830 may be coupled to a network 860 to communicate (e.g., send and/or receive) media information to and from network 860. Content delivery device(s) 840 also may be coupled to platform 802 and/or to display 820.

In various implementations, content services device(s) 830 may include a cable television box, personal computer, network, telephone, Internet enabled devices or appliance capable of delivering digital information and/or content, and any other similar device capable of unidirectionally or bidirectionally communicating content between content providers and platform 802 and/display 820, via network 860 or directly. It will be appreciated that the content may be communicated unidirectionally and/or bidirectionally to and from any one of the components in system 800 and a content provider via network 860. Examples of content may include any media information including, for example, video, music, medical and gaming information, and so forth.

Content services device(s) 830 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 802 may receive control signals from navigation controller 850 having one or more navigation features. The navigation features of controller 850 may be used to interact with user interface 822, for example. In implementations, navigation controller 850 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 850 may be replicated on a display (e.g., display 820) by movements of a pointer, cursor, focus ring, or other visual indicators displayed on the display. For example, under the control of software applications 816, the navigation features located on navigation controller 850 may be mapped to virtual navigation features displayed on user interface 822, for example. In implementations, controller 850 may not be a separate component but may be integrated into platform 802 and/or display 820. The present disclosure, however, is not limited to the elements or in the context shown or described herein.

In various implementations, drivers (not shown) may include technology to enable users to instantly turn on and off platform 802 like a television with the touch of a button after initial boot-up, when enabled, for example. Program logic may allow platform 802 to stream content to media adaptors or other content services device(s) 830 or content delivery device(s) 840 even when the platform is turned "off." In addition, chipset 805 may include hardware and/or software support for 7.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 800 may be integrated. For example, platform 802 and content services device(s) 830 may be integrated, or platform 802 and content delivery device(s) 840 may be integrated, or platform 802, content services device(s) 830, and content delivery device(s) 840 may be integrated, for example. In various implementations, platform 802 and display 820 may be an integrated unit. Display 820 and content service device(s) 830 may be integrated, or display 820 and content delivery device(s) 840 may be integrated, for example. These examples are not meant to limit the present disclosure.

In various implementations, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 8.

Figure 9:
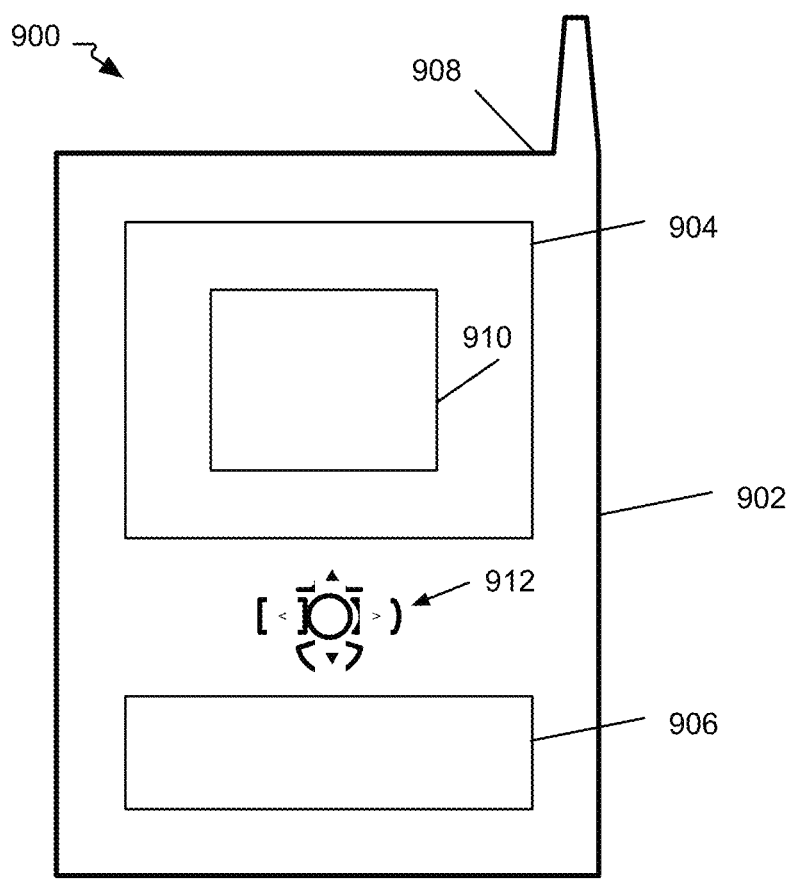
FIG. 9 illustrates another example device, all arranged in accordance with at least some implementations of the present disclosure.

As described above, system 700 or 800 may be implemented in varying physical styles or form factors. FIG. 9 illustrates implementations of a small form factor device 900 in which system 700 or 800 may be implemented. In implementations, for example, device 900 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 9, device 900 may include a housing 902, a display 904, an input/output (I/O) device 906, and an antenna 908. Device 900 also may include navigation features 912. Display 904 may include any suitable screen 910 on a display unit for displaying information appropriate for a mobile computing device. I/O device 906 may include any suitable I/O device for entering information into a mobile computing device. Examples for I/O device 906 may include an alphanumeric keyboard, a numeric keypad, a touch pad, input keys, buttons, switches, rocker switches, microphones, speakers, voice recognition device and software, and so forth. Information also may be entered into device 900 by way of microphone (not shown). Such information may be digitized by a voice recognition device (not shown). The implementations are not limited in this context.

Various implementations may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects described above may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to additional implementations.

By one example, a computer-implemented method of video playback comprising: obtaining first image pixel data of at least a portion of an image; obtaining second image pixel data of the image having pixel data of multiple color channels from a main band used to transmit the second image pixel data; obtaining transparency-related alpha data associated with the pixels of the second image pixel data, wherein the alpha data forms an alpha channel sideband used to transmit the alpha data separate from the main band; and providing the first image pixel data, the second image pixel data from the main band, and the alpha data from the alpha channel sideband to be blended to form a composite layer to be used to display the image.

By another example, the method also may include wherein the first image pixel data is in a first dynamic range, the method comprising converting the second image pixel data from a second dynamic range different from the first dynamic range, and to the first dynamic range before the first image pixel data, the second image pixel data, and the alpha data are blended; wherein the first dynamic range is in high dynamic range (HDR) and the second dynamic range is in standard dynamic range (SDR); wherein the alpha channel sideband provides a stream of words where each word has at least one 8-bit alpha value, and the word size is a multiple of eight bits, wherein the individual words each have 32 bits and carry four 8-bit alpha data values; wherein the second image data comprises 32-bit words each having data of red, green, and blue (RGB) channels using 10 bits for each channel and 2 bits extra; wherein the alpha channel sideband is used to transfer the alpha data between a memory and a processor to perform the blending; the method comprising converting the second image data from SDR to HDR formats by tone mapping, and extracting the alpha data to be placed in the alpha channel sideband, and padding a final alpha data word of an individual frame to align the last word of the frame to have the same bit size as the other words in the frame; wherein the first image data comprises content of a video sequence, and the second image data comprises content of an application interface that forms at least one of: a frame at one or more sides of the video sequence, and at least partially transparent activation buttons over the video sequence; and wherein the first image pixel data is transmitted to a device that decompresses the first image pixel data and has the second image pixel data in a non-compressed state.

It will be understood that these features of the method mentioned immediately above may be used alone, in a combination with all of these features, or any combination of them as the nature of the feature(s) and context herein permits.

In a further example, a computer-implemented system of video playback comprises at least one memory; at least one display; at least one processor communicatively connected to the at least one display and at least one memory; and a dynamic range convertor arranged to operate by: obtaining image pixel data of an image in a first dynamic range and having non-alpha pixel data and transparency-related alpha data, converting the non-alpha pixel data to a second dynamic range, and placing the converted non-alpha pixel data in a main band; and an alpha data handling unit arranged to operate by placing the alpha data from the image pixel data in an alpha channel sideband separate from the non-alpha pixel data placed in the main band.

The system also may comprise a blending unit receiving other image data in the first dynamic range and of the image, the non-alpha pixel data in the first dynamic range from the main band, and the alpha data from the alpha channel sideband to blend the other image data, the non-alpha pixel data, and the alpha data to form a composite layer of the image to be used to display the image, wherein the alpha channel sideband transfers the alpha data between a memory and a processor to perform the blending; wherein the first dynamic range is in standard dynamic range (SDR), and the second dynamic range is in high dynamic range (HDR); wherein the alpha channel sideband provides a stream of words where each word has at least one 8-bit alpha value, and the word size is a multiple of eight bits, wherein the individual words each have 32 bits and carry four 8-bit alpha data values; wherein the non-alpha pixel data comprises 32-bit words each having data of red, green, and blue (RGB) channels using 10 bits for each channel and 2 bits extra; wherein the non-alpha pixel data is converted from SDR to HDR formats by tone mapping, and the alpha data is extracted from the image data to be placed in the alpha channel sideband; wherein a final alpha data word of an individual frame is padded to align the last word of the frame to have the same bit size as the other words in the frame; wherein the image pixel data is second image pixel data, and wherein first pixel image data comprises content of a video sequence, and the second image pixel data comprises content of an application interface that forms at least one of: a frame at one or more sides of the video sequence, and transparent activation buttons over the video sequence; wherein the first image pixel data is transmitted to a device that decompresses the first image pixel data and wherein the device has the second image pixel data in a non-compressed state; wherein the first image pixel data is in the second dynamic range, the method comprising converting the non-alpha data of the second image pixel data from the first dynamic range to the second dynamic range before the first image pixel data, the second image pixel data, and the alpha data are blended.

It will be understood that these features of the system mentioned immediately above may be used alone, in a combination with all of these features, or any combination of them as the nature of the feature(s) and context herein permits.

In another approach, a computer-readable medium having instructions stored thereon that when executed by a computing device to be operated by: obtaining first image pixel data of at least a portion of an image and in a first dynamic range; obtaining second image pixel data of the image and having non-alpha pixel data in a second dynamic range and transparency-related alpha data; converting the non-alpha pixel data from the second dynamic range to the first dynamic range; placing the non-alpha pixel data into a main band and having pixel data of multiple color channels; placing the transparency-related alpha data into an alpha channel sideband used to transmit the alpha data separate from the main band; and providing the first image pixel data, the converted non-alpha pixel data from the main band, and the alpha data from the alpha channel sideband to be blended to form a composite layer to be used to display the image.

In another example, the instructions may cause the computing device to include that wherein the first dynamic range is in high dynamic range (HDR) and the second dynamic range is in standard dynamic range (SDR); wherein the alpha channel sideband provides a stream of words where each word has at least one 8-bit alpha value, and the word size is a multiple of eight bits, wherein the individual words each have 32 bits and carry four 8-bit alpha data values; wherein the second image data comprises 32-bit words each having data of red, green, and blue (RGB) channels using 10 bits for each channel and 2 bits extra; wherein the alpha channel sideband is used to transfer the alpha data between a memory and a processor to perform the blending; the instructions causing the computing device to operate by: converting the second image data from SDR to HDR formats by tone mapping, and extracting the alpha data to be placed in the alpha channel sideband; and padding a final alpha data word of an individual frame to align the last word of the frame to have the same bit size as the other words in the frame; wherein the first image data comprises content of a video sequence, and the second image data comprises content of an application interface that forms at least one of: a frame at one or more sides of the video sequence, and at least partially transparent activation buttons over the video sequence; wherein the first image pixel data is transmitted to a device that decompresses the first image pixel data and the device already has the second image pixel data in a non-compressed state.

It will be understood that these features caused by the instructions mentioned immediately above may be used alone, in a combination with all of these features, or any combination of them as the nature of the feature(s) and context herein permits.

In yet another example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed is:

1. A computer-implemented method of video playback comprising:
   obtaining first image pixel data of at least a portion of an image;
   obtaining second image pixel data of the image having pixel data of multiple color channels from a main band used to transmit the second image pixel data;
   obtaining transparency-related alpha data associated with the pixels of the second image pixel data, wherein the alpha data forms an alpha channel sideband used to transmit the alpha data separate from the main band; and
   providing the first image pixel data, the second image pixel data from the main band, and the alpha data from the alpha channel sideband to be blended to form a composite layer to be used to display the image, wherein the first image data comprises content of a video sequence, and the second image data comprises content of an application interface that forms at least one of: a frame at one or more sides of the video sequence, and at least partially transparent activation buttons over the video sequence.

2. The method of claim 1 wherein the first image pixel data is in a first dynamic range, the method comprising converting the second image pixel data from a second dynamic range different from the first dynamic range, and to the first dynamic range before the first image pixel data, the second image pixel data, and the alpha data are blended.

3. The method of claim 2 wherein the first dynamic range is in high dynamic range (HDR) and the second dynamic range is in standard dynamic range (SDR).

4. The method of claim 1 wherein the alpha channel sideband provides a stream of words where each word has at least one 8-bit alpha value, and the word size is a multiple of eight bits.

5. The method of claim 4 wherein the individual words each have 32 bits and carry four 8-bit alpha data values.

6. The method of claim 1 wherein the second image data comprises 32-bit words each having data of red, green, and blue (RGB) channels using 10 bits for each channel and 2 bits extra.

7. The method of claim 1 wherein the alpha channel sideband is used to transfer the alpha data between a memory and a processor to perform the blending.

8. The method of claim 1 comprising converting the second image data from SDR to HDR formats by tone mapping while extracting the alpha data to be placed in the alpha channel sideband.

9. The method of claim 1 comprising padding a final alpha data word of an individual frame to align the last word of the frame to have the same bit size as the other words in the frame.

10. The method of claim 1 wherein the first image pixel data is transmitted to a device that decompresses the first image pixel data and has the second image pixel data in a non-compressed state;
wherein the first image pixel data is in a first dynamic range, the method comprising converting the second image pixel data from a second dynamic range different from the first dynamic range, and to the first dynamic range before the first image pixel data, the second image pixel data, and the alpha data are blended; and
wherein the alpha channel sideband is used to transfer the alpha data between a memory and a processor to perform the blending.

11. A computer-implemented system of video playback comprising:
at least one memory;
at least one display;
at least one processor communicatively connected to the at least one display and at least one memory; and
a dynamic range convertor arranged to operate by:
obtaining image pixel data of an image in a first dynamic range and having non-alpha pixel data and transparency-related alpha data,
converting the non-alpha pixel data to a second dynamic range, and
placing the converted non-alpha pixel data in a main band; and
an alpha data handling unit arranged to operate by placing the alpha data from the image pixel data in an alpha channel sideband separate from the non-alpha pixel data placed in the main band,
wherein the first image data comprises content of a video sequence, and the second image data comprises content of an application interface that forms at least one of: a frame at one or more sides of the video sequence, and at least partially transparent activation buttons over the video sequence.

12. The system of claim 11 comprising a blending unit receiving other image data in the first dynamic range and of the image, the non-alpha pixel data in the first dynamic range from the main band, and the alpha data from the alpha channel sideband to blend the other image data, the non-alpha pixel data, and the alpha data to form a composite layer of the image to be used to display the image.

13. The system of claim 12 wherein the alpha channel sideband transfers the alpha data between a memory and a processor to perform the blending.

14. The system of claim 11 wherein the first dynamic range is in standard dynamic range (SDR), and the second dynamic range is in high dynamic range (HDR).

15. The system of claim 11 wherein the alpha channel sideband provides a stream of words where each word has at least one 8-bit alpha value, and the word size is a multiple of eight bits.

16. The system of claim 15 wherein the individual words each have 32 bits and carry four 8-bit alpha data values.

17. The system of claim 11 wherein the non-alpha pixel data comprises 32-bit words each having data of red, green, and blue (RGB) channels using 10 bits for each channel and 2 bits extra.

18. The system of claim 11 wherein the non-alpha pixel data is converted from SDR to HDR formats by tone mapping, and the alpha data is extracted from the image data to be placed in the alpha channel sideband.

19. The system of claim 11 wherein a final alpha data word of an individual frame is padded to align the last word of the frame to have the same bit size as the other words in the frame.

20. The system of claim 11 wherein the image pixel data is second image pixel data, and wherein first pixel image data comprises content of a video sequence, and the second image pixel data comprises content of an application interface that forms at least one of: a frame at one or more sides of the video sequence, and transparent activation buttons over the video sequence;
wherein the first image pixel data is transmitted to a device that decompresses the first image pixel data and wherein the device has the second image pixel data in a non-compressed state;
wherein the first image pixel data is in the second dynamic range, the method comprising converting the non-alpha data of the second image pixel data from the first dynamic range to the second dynamic range before the first image pixel data, the second image pixel data, and the alpha data are blended; and
wherein the alpha channel sideband is used to transfer the alpha data between a memory and at least one processor to perform the blending.

21. At least one non-transitory computer-readable medium having stored thereon instructions that when executed cause a computing device to operate by:
obtaining first image pixel data of at least a portion of an image and in a first dynamic range;
obtaining second image pixel data of the image and having non-alpha pixel data in a second dynamic range and transparency-related alpha data;
converting the non-alpha pixel data from the second dynamic range to the first dynamic range;

placing the non-alpha pixel data into a main band and having pixel data of multiple color channels;

placing the transparency-related alpha data into an alpha channel sideband used to transmit the alpha data separate from the main band; and providing the first image pixel data, the converted non-alpha pixel data from the main band, and the alpha data from the alpha channel sideband to be blended to form a composite layer to be used to display the image, wherein the first image data comprises content of a video sequence, and the second image data comprises content of an application interface that forms at least one of: a frame at one or more sides of the video sequence, and at least partially transparent activation buttons over the video sequence.

22. The medium of claim 21 wherein the alpha channel sideband provides a stream of words where each word has at least one 8-bit alpha value, and the word size is a multiple of eight bits, wherein the individual words each have 32 bits and carry four 8-bit alpha data values.

23. The medium of claim 21 wherein the second image data comprises 32-bit words each having data of red, green, and blue (RGB) channels using 10 bits for each channel and 2 bits extra.

24. The medium of claim 21 wherein the first dynamic range is in high dynamic range (HDR) and the second dynamic range is in standard dynamic range (SDR);
- wherein the alpha channel sideband provides a stream of words where each word has at least one 8-bit alpha value, and the word size is a multiple of eight bits, wherein the individual words each have 32 bits and carry four 8-bit alpha data values;
- wherein the second image data comprises 32-bit words each having data of red, green, and blue (RGB) channels using 10 bits for each channel and 2 bits extra;
- wherein the alpha channel sideband is used to transfer the alpha data between a memory and a processor to perform the blending;
- the instructions causing the computing device to operate by: converting the second image data from SDR to HDR formats by tone mapping, and extracting the alpha data to be placed in the alpha channel sideband;
- and padding a final alpha data word of an individual frame to align the last word of the frame to have the same bit size as the other words in the frame;
- wherein the first image pixel data is transmitted to a device that decompresses the first image pixel data and the device already has the second image pixel data in a non-compressed state.

* * * * *